US009355825B2

(12) United States Patent
Liu et al.

(10) Patent No.: US 9,355,825 B2
(45) Date of Patent: May 31, 2016

(54) IONIZATION VACUUM GAUGE

(71) Applicants: Peng Liu, Beijing (CN); Duan-Liang Zhou, Beijing (CN); Chun-Hai Zhang, Beijing (CN); Jing Qi, Beijing (CN); Pi-Jin Chen, Beijing (CN); Shou-Shan Fan, Beijing (CN)

(72) Inventors: Peng Liu, Beijing (CN); Duan-Liang Zhou, Beijing (CN); Chun-Hai Zhang, Beijing (CN); Jing Qi, Beijing (CN); Pi-Jin Chen, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 454 days.

(21) Appl. No.: 13/661,011

(22) Filed: Oct. 25, 2012

(65) Prior Publication Data

US 2013/0106431 A1 May 2, 2013

(51) Int. Cl.

*G01L 21/34* (2006.01)
*B82Y 10/00* (2011.01)
*B82Y 30/00* (2011.01)
*H01J 41/06* (2006.01)

(52) U.S. Cl.

CPC .................................... *H01J 41/06* (2013.01)

(58) Field of Classification Search

CPC ......... H01J 41/06; B82Y 35/00; B82Y 30/00; B82Y 10/00
USPC .................................. 324/460; 977/742, 954
See application file for complete search history.

(56) References Cited

U.S. PATENT DOCUMENTS

| | | | | |
|---|---|---|---|---|
| 4,939,425 A * | 7/1990 | Bernardet | H01J 27/08 250/426 |
| 7,129,708 B1 * | 10/2006 | Liu | G01N 27/62 324/460 |
| 2003/0057953 A1 * | 3/2003 | Rutherford et al. | 324/460 |
| 2005/0237066 A1 * | 10/2005 | Liu et al. | 324/460 |
| 2009/0134127 A1 * | 5/2009 | Wei et al. | 219/121.21 |
| 2009/0322258 A1 | 12/2009 | Nguyen | |
| 2011/0234233 A1 * | 9/2011 | Brucker | 324/460 |
| 2012/0169347 A1 * | 7/2012 | Wei et al. | 324/459 |

OTHER PUBLICATIONS

Mauger et al. "Freestanding vertically aligned arrays of individual carbon nanotubes on metallic substrates for field emission cathodes" Jul. 12, 2004, APL, vol. 85, No. 2, pp. 305-307.*

Knapp et al., Investigation of ionization gauges with carbon nanotube (CNT) field-emitter cathodes, Journal of Physics: Conference Series, 2008, vol. 100, pp. 092007.

"Vacuum measurement based on field emission of CNT yarn", Yang Yuan-chao et al., vol. 47,No. 4,pp. 75-78, Jul. 2010.

"Experimental Study and Electric Field Simulation of a UHV Saddle Field Gauge with a CNT field Emitter", Sheng Lei-mei et al., pp. 181-183, Jul. 2005.

* cited by examiner

*Primary Examiner* — Melissa Koval
*Assistant Examiner* — Courtney McDonnough
(74) *Attorney, Agent, or Firm* — Novak Druce Connolly Bove + Quigg LLP

(57) ABSTRACT

An ionization vacuum gauge includes a cathode, an anode and an ion collector. The ion collector component is located at one side of the anode component and spaced from the anode component. The cathode component is located at another side of the anode component and includes an electron emitter, which extends toward the anode component from the cathode component. The electron emitter includes at least one carbon nanotube wire.

19 Claims, 7 Drawing Sheets

IONIZATION VACUUM GAUGE

CROSS-REFERENCE TO RELATED APPLICATIONS

This application claims all benefits accruing under 35 U.S.C. §119 from China Patent Application No. 201110333503.7, filed on Oct. 28, 2011 in the China Intellectual Property Office, disclosure of which is incorporated herein by reference.

BACKGROUND

1. Technical Field

The present disclosure relates to vacuum gauges, and particularly to an ionization vacuum gauge.

2. Description of Related Art

Conventional ionization vacuum gauges include a hot filament, an anode electrode surrounding the hot filament, and an ion collector surrounding the anode electrode. The anode electrode and the ion collector are coaxial relative to the hot filament. In operation, electrons emit from the hot filament, travel toward and through the anode electrode and eventually are collected by the anode electrode. As the electrons travel, they collide with the molecules and atoms of gas and produce ions, and eventually the ions are collected by the ion collector. The pressure, P, of the vacuum system can be calculated by the formula $P=(1/k)(I_{ion}/I_{electron})$, wherein k is a constant with the unit of 1/torr and is characteristic of a particular gauge geometry and electrical parameters, $I_{ion}$ is a current of the ion collector, and $I_{electron}$ is a current of the anode electrode.

However, the hot filament of the conventional ionization vacuum gauge is generally a hot tungsten filament. In operation, the tungsten filament requires several watts of electrical power to operate, and dissipates a great deal of heat and light in the vacuum system, and consequently the power consumption of the conventional ionization vacuum gauge is high. Furthermore, the high temperature of the hot tungsten filament can cause evaporation, and thus is not conducive to the vacuum system. The operation of hot filament will also induce the gas molecule dispersion and lower the vacuum.

What is needed, therefore, is an ionization vacuum gauge that overcomes the problems as discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present ionization vacuum gauge.

Figure 1:
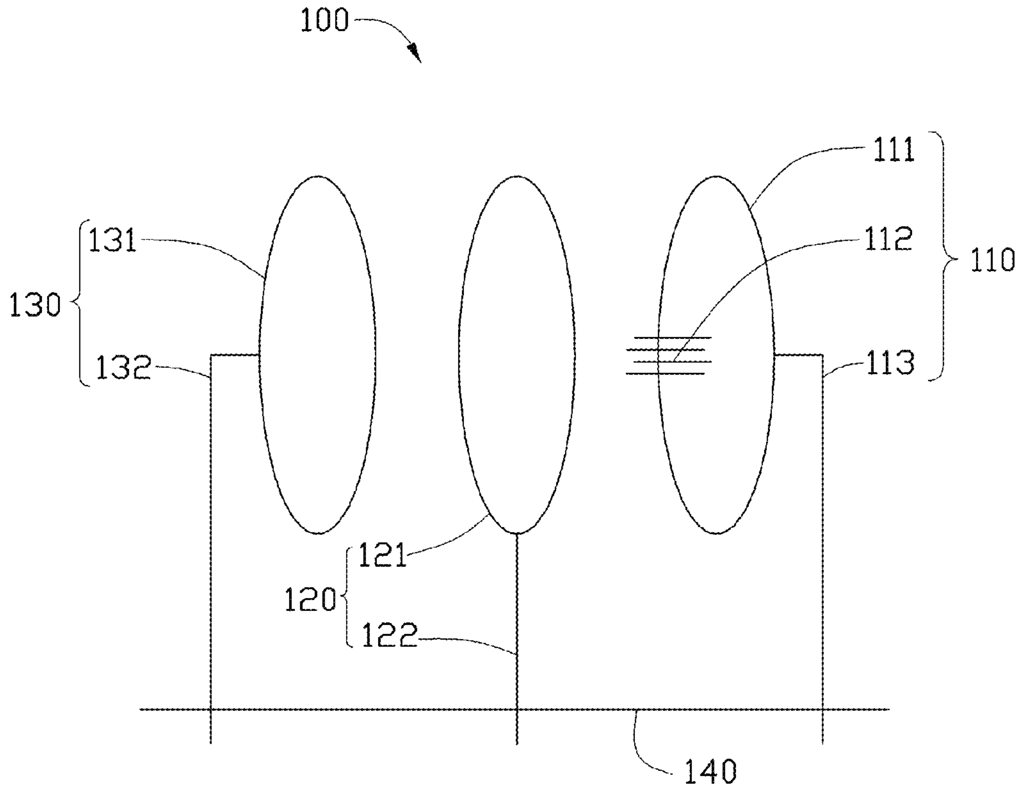
FIG. 1 is a schematic view of one embodiment of an ionization vacuum gauge.

Referring to FIG. 1, an ionization vacuum gauge 100 of one embodiment is shown. The ionization vacuum gauge 100 includes a cathode component 110, an anode component 120, an ion collector component 130, and a fixing device 140. The ion collector component 130 is located at one side of the anode component 120 and the cathode component 110 is located at another side of the anode component 120. The cathode component 110, the anode component 120, and the ion collector component 130 are spaced from one another and are not in direct electrical contact with each other. The cathode component 110, the anode component 120, and the ion collector component 130 are fixed by the fixing device 140.

The anode component 120 includes an anode 121 and an anode lead 122 electrically connected to the anode 121. The anode lead 122 is fixed by the fixing device 140 and electrically connected to the external circuit (not shown). The anode lead 122 includes a conductor coated with an insulating layer. The material of the conductor can be made, e.g., of nickel, tungsten, or copper, and the diameter of the conductor can be selected according to need. In one embodiment, the conductor is a copper wire with a diameter in a range from about 100 micrometers to about 1 centimeter. The material of the insulating layer can be glasses, ceramics, or polymer. In one embodiment, the material of the insulating layer is glass.

The anode 121 can be a metallic ring or a metallic disk with a through hole. The diameter of the metallic ring or the through hole can range from about 4 millimeters to about 10 millimeters. In one embodiment, the diameter of the metallic ring is 6 millimeters. The metallic ring can be made of metallic thread with a diameter in a range from about 50 micrometers to about 10 millimeters. The anode 121 and the anode lead 122 can be made of single metallic thread to form an integrated structure. The diameter of the metallic disk ranges from about 4.1 millimeters to about 12 millimeters. The metallic disk is electrically connected with the anode lead 122. The material of the anode 121 can be nickel, tungsten, or copper.

The ion collector component 130 includes an ion collector 131 and an ion collector lead 132 electrically connected to the ion collector 131. The ion collector 131 is fixed to the fixing device 140 via the ion collector lead 132. The ion collector lead 132 is electrically connected to the external circuit.

The ion collector 131 has a porous and/or planar structure, such as a metallic ring, a metal-enclosed aperture, a metallic net, or a metallic sheet. The ion collector 131 is parallel with and spaced from the anode 121 with a distance in a range from about 4 millimeters to about 10 millimeters. The thickness of the ion collector 131 is in a range from about 50 micrometers to about 1 millimeter. In one embodiment, the ion collector 131 is a metallic disk.

The cathode component 110 includes a cathode 111, an electron emitter 112, and a cathode lead 113. The electron emitter 112 is electrically connected to the cathode 111, and the cathode 111 is electrically connected to the cathode lead 113 which is electrically connected to the external circuit.

The cathode 111 and the ion collector 131 are located on the opposite sides of anode 121 respectively. The cathode 111 is spaced from the anode 121 with a certain interval in a range from about 4 millimeters to about 10 millimeters. The cathode 111 can be a metallic disk made e.g., of nickel, tungsten, or copper. The surface of the cathode 111 can be parallel with that of the anode 121. In one embodiment, the distance $d_1$ between the cathode 111 and the anode 121 is equal to the distance $d_2$ between the ion collector 131 and the anode 121. Furthermore, the distance $d_1$ and distance $d_2$ can be equal to the inner radius of the anode 121 or the radius of the through hole of the anode 121. The center point of the cathode 111, the center point of the anode 121 and the center point of the ion collector 131 can be on a common straight line to form a symmetrical structure to effectively collect ions. In one embodiment, the inner radius of the anode 121 is equal to the radius of the cathode 111.

Figure 4:
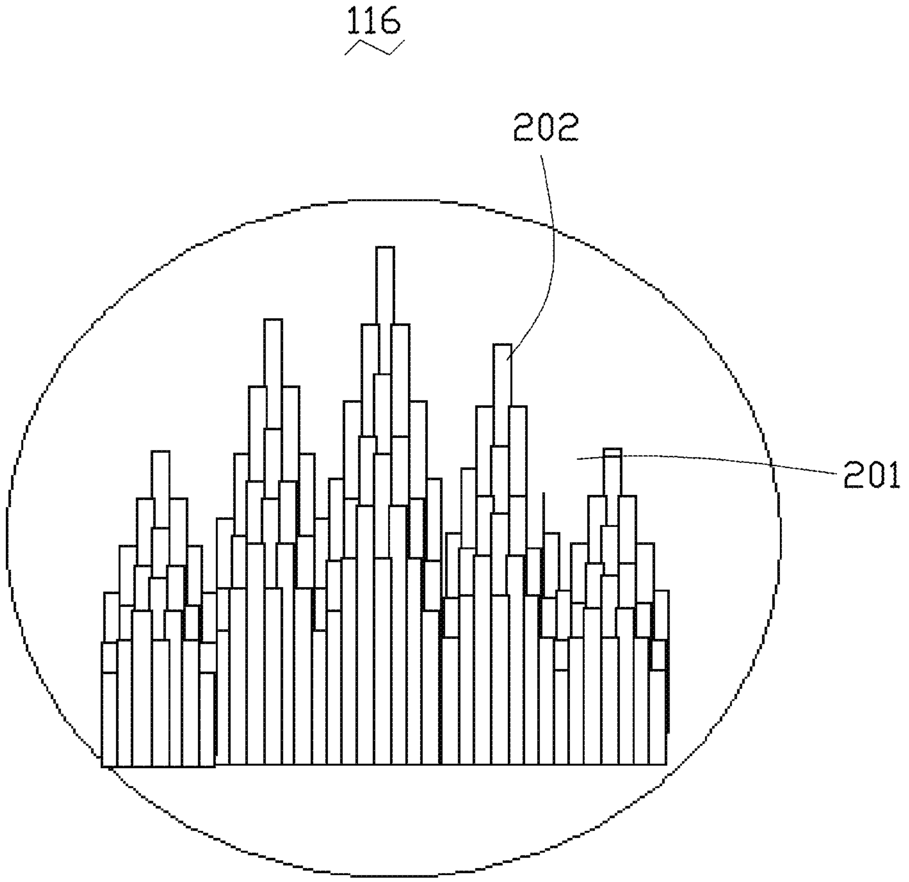
FIG. 4 is a schematic, amplificatory view of one embodiment of an electron emitter of the ionization vacuum gauge.

The electron emitter 112 can be a carbon nanotube wire structure. The carbon nanotube wire structure includes at least one carbon nanotube wire. The electron emitter 112 includes a first end and a second end. The first end is fixed to the cathode 111, and the second end extends toward and spaced from the anode 121. The second end of the electron emitter 112 is substantially aimed at the center point of the anode 121. The second end of the electron emitter 112 is configured as an electron emitting terminal 116 as shown in FIG. 4. The electron emitting terminal 116 is spaced from the anode 121 with a certain distance in a range from about 1 millimeter to about 9 millimeters. The length of the electron emitter 112 ranges from about 1 millimeter to about 7 millimeters. In one embodiment, the length of the electron emitter 112 is about 3 millimeters.

The electron emitter 112 can be fixed on and electrically connected to the center point of the cathode 111 by conductive binder or van der Waals force. The conductive binder includes conductive particles, low-melting-point glass powders, and organic carrier. The weight percents of the foregoing ingredients are respectively: about 10%~20% of conductive particles, about 5% of low-melting-point glass powders, and about 75%~85% of the organic carrier. The conductive particles can be indium tin oxide particles or silver particles. The melting point of the low-melting-point glass powders ranges from about 300° C. to about 600° C. The melting point of the low-melting-point glass powders is lower than the melting point of the cathode 111, ensuring that the low-melting-point glass powders is melted first under heating.

The carbon nanotube wire structure can include single carbon nanotube wire, or a plurality of carbon nanotube wires. The singe carbon nanotube wire or each of the carbon nanotube wires includes a first end fixed to the cathode 111, and a second end extending toward and spaced from the anode 121. The plurality of carbon nanotube wires can be parallel and spaced from each other, and the distance between two adjacent carbon nanotube wires in a range from about 1 millimeter to about 3 millimeters. The first ends of the plurality of carbon nanotube wires can distribute in a shape of square, circle, or hexagon on the surface of the cathode 111.

The carbon nanotube wire can be only consisted of carbon nanotubes. The carbon nanotube wire can also composed of carbon nanotubes and other material. The carbon nanotube wire is a free-standing structure. The carbon nanotube wire can be untwisted carbon nanotube wire or twisted carbon nanotube wire. The untwisted carbon nanotube wire and the twisted carbon nanotube wire can also be a free-standing structure. The term "free-standing structure" means that the carbon nanotube wire can sustain the weight of itself when it is hoisted by a portion thereof without any significant damage to its structural integrity. Thus, the carbon nanotube wire can be suspended by two spaced supports.

Figure 2:
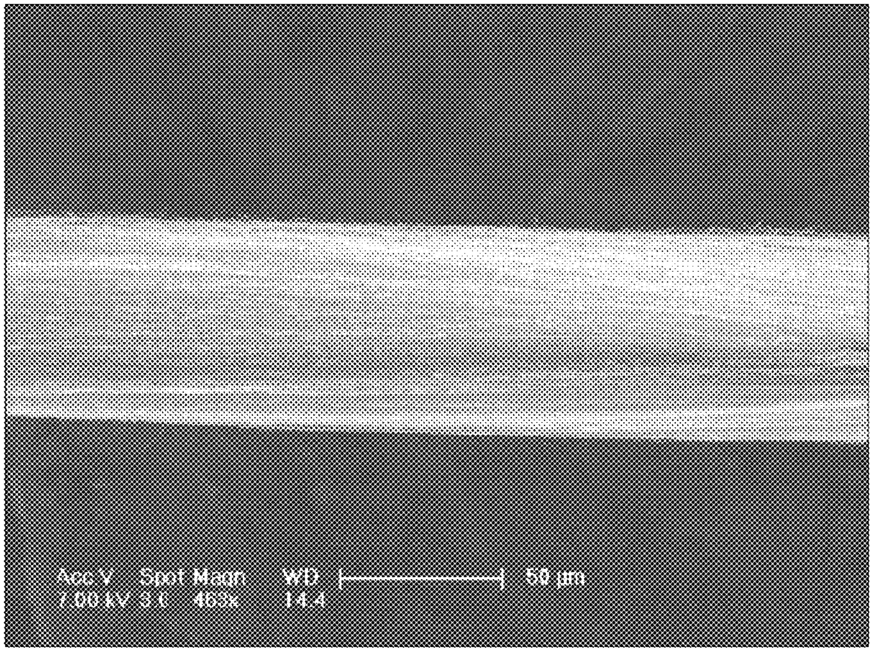
FIG. 2 is a scanning electron microscope (SEM) image of an untwisted carbon nanotube wire.

Referring to FIG. 2, the untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nm to about 100 μm. Treating the drawn carbon nanotube film with a volatile organic solvent can form the untwisted carbon nanotube wire. Specifically, the organic solvent is applied to soak the entire surface of the drawn carbon nanotube film. During soaking, adjacent parallel carbon nanotubes in the drawn carbon nanotube film will bundle together, due to the surface tension of the organic solvent as it volatilizes, and thus, the drawn carbon nanotube film will be shrunk into untwisted carbon nanotube wire.

Figure 3:
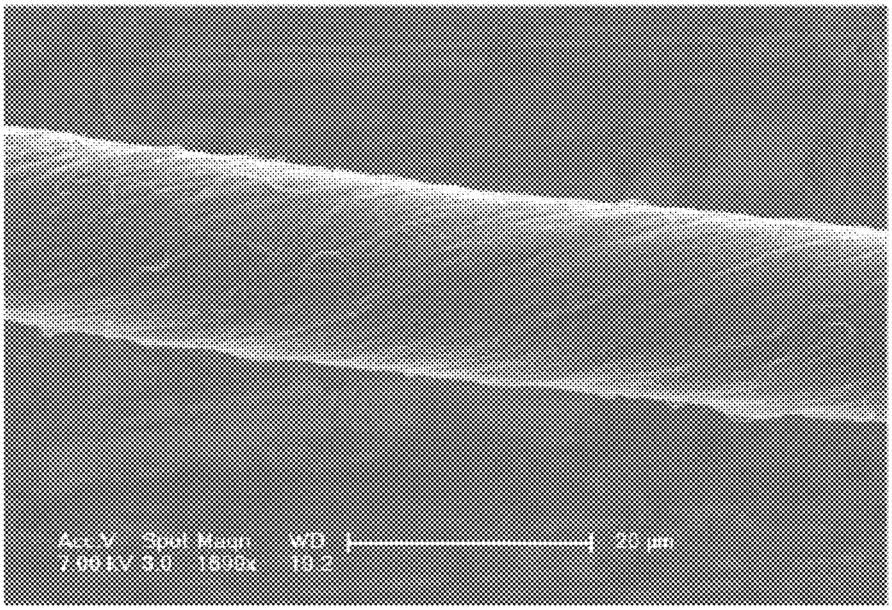
FIG. 3 is a SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 3, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. Length of the carbon nanotube wire can be set as desired. A diameter of the twisted carbon nanotube wire can be from about 0.5 nm to about 100 μm. Further, the twisted carbon nanotube wire can be treated with a volatile organic solvent after being twisted. After being soaked by the organic solvent, the adjacent paralleled carbon nanotubes in the twisted carbon nanotube wire will bundle together, due to the surface tension of the organic solvent when the organic solvent volatilizing. The specific surface area of the twisted carbon nanotube wire will decrease, while the density and strength of the twisted carbon nanotube wire will be increased.

Figure 5:
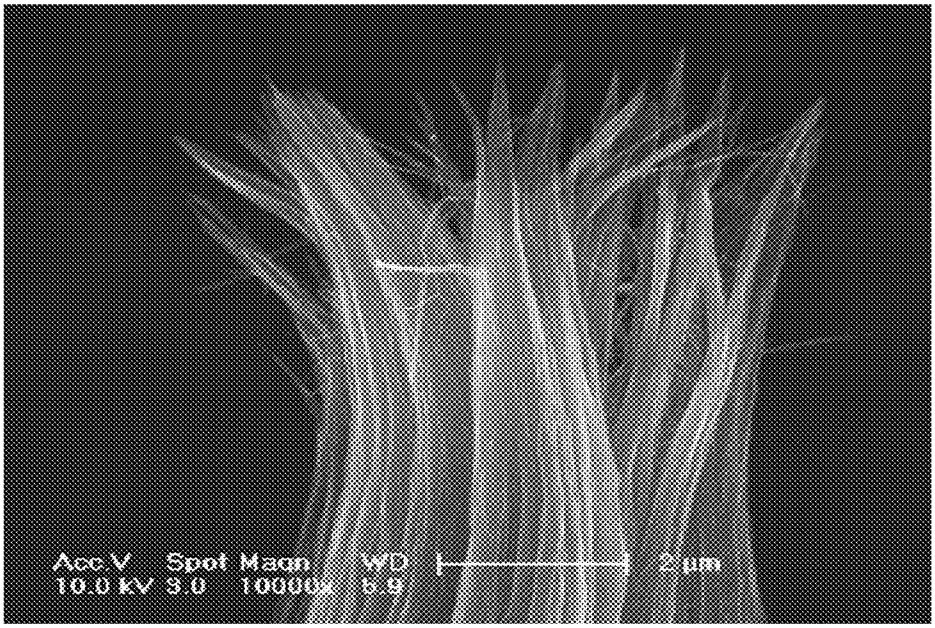
FIG. 5 is a SEM image of one embodiment of an electron emitter of the ionization vacuum gauge.
Figure 6:
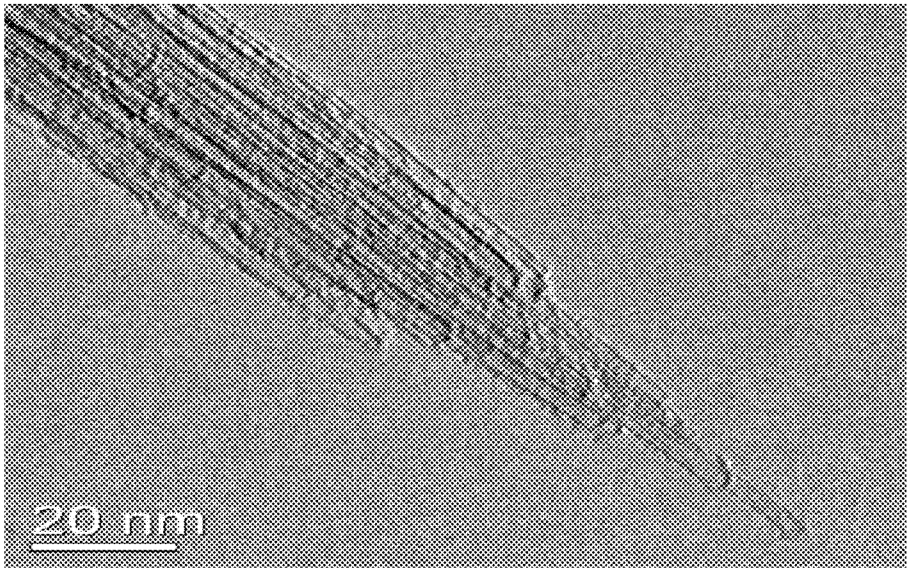
FIG. 6 is a transmission electron microscope (TEM) of one embodiment of an electron emitter of the ionization vacuum gauge.

The electron emitter 112 can be obtained by cutting the carbon nanotube wire mentioned above via a mechanical method, laser irradiating, or vacuum melting. Referring to FIG. 4, the carbon nanotube wire is cut by laser irradiating or vacuum melting. The electron emitting terminal 116 of the electron emitter 112 includes a plurality of electron emitting peaks 201. Each of the electron emitting peaks 201 is composed of a number of closely packed carbon nanotube bundles, and each of the carbon nanotube bundles includes a number of carbon nanotubes, which are substantially parallel to each other and are joined by van der Waals attractive force. Furthermore, each carbon nanotube bundle includes a single carbon nanotube 202 protruding out of the carbon nanotube bundle from the middle of the carbon nanotube bundle. A diameter of the single carbon nanotube 202 is smaller than 5 nanometers. In one embodiment, the diameter of the single carbon nanotube 202 is about 4 nanometers. The singe carbon nanotube 202 includes a first end extending away from the carbon nanotube bundle, and a second end enclosed by the carbon nanotube bundle to effectively conduct the heat. Referring to FIGS. 5 and 6, the plurality of carbon nanotube bundles form a tooth-shaped structure, i.e., some carbon nanotubes protruding and higher than the adjacent carbon nanotubes. The distance between adjacent protruded two of the single carbon nanotubes 202 ranges from about 0.1 micrometers to about 2 micrometers. The ratio between this distance and the diameter of the single carbon nanotube 202 ranges from about 20:1 to about 500:1. Thus the electron screening effects can be effectively reduced, and the emitting current can be improved.

The material of the fixing device 140 can be insulated material or metallic conductor. The shape of the fixing device 140 is arbitrary as long as the fixing device 140 has certain mechanical strength to fix other devices. In one embodiment, the fixing device 140 is a glass column. The cathode lead 113, the anode lead 122, and the ion collector lead 132 can be fixed to the glass column via binder or a number of holes on the glass column.

In operation of the ionization vacuum gauge 100, an electric voltage is applied between the cathode and the anode, the cathode emits electrons. The electric potential of the anode is higher than that of the cathode. In one embodiment, the electric potential of the anode ranges from about 500 V to about 1000 V, the electric potential of the cathode ranges from about 30 V to about 90 V, and the electrical potential of the ion collector is zero. The electrons are drawn and accelerated towards the anode by the electric field force, then tend to pass through the anode because of the inertia of the electrons thereof. The ion collector is supplied with a negative electric potential for decelerating the electrons. Therefore, before arriving at the ion collector, electrons are drawn back to the anode, and an electric current ($I_{electron}$) is formed. In the travel of the electrons, electrons collide with gas molecules, and ionize some of gas molecules, and thus ions are produced in this process. Typically, the ions are in the form of positive ions and are collected by the ion collector, and, thus, an ion current ($I_{ion}$) is formed. A ratio of $I_{ion}$ to $I_{electron}$ is proportional to the pressure in the ionization vacuum gauge, within a certain pressure range, covering the primary range of interest for most vacuum devices. Therefore, the pressure in the ionization vacuum gauge and, by extension, the vacuum device (not shown), to which it is fluidly attached, can be measured according to the above.

Figure 7:
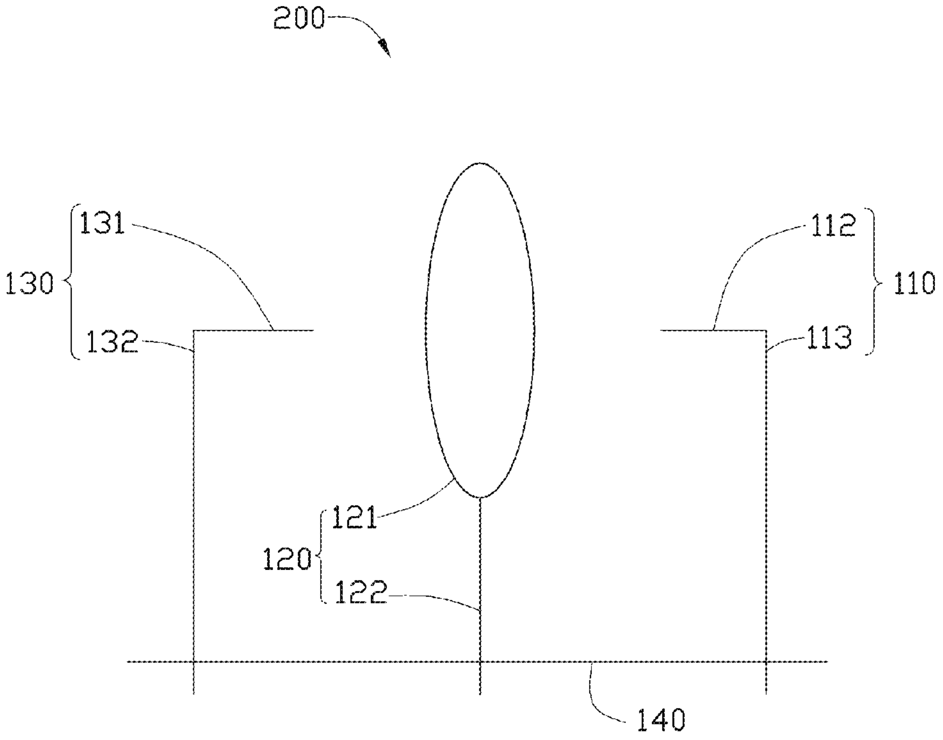
FIG. 7 is a schematic view of one embodiment of an ionization vacuum gauge.

Referring to FIG. 7, an ionization vacuum gauge 200 of one embodiment is shown. The ionization vacuum gauge 200 includes a cathode component 110, an anode component 120, an ion collector component 130, and a fixing device 140. The anode component 120 is located between the cathode component 110 and the ion collector component 130. The cathode component 110, the anode component 120, and the ion collector component 130 are spaced from one another and are not in direct electrical contact with each other. The cathode component 110, the anode component 120, and the ion collector component 130 are fixed by the fixing device 140. The structure of the ionization vacuum gauge 200 is similar to the structure of the ionization vacuum gauge 100 except that, the cathode 111 is omitted, and the ion collector 131 is a linear structure electrically connected to the ion collector lead 132. The ratio between the length of the linear structure and the diameter of the linear structure can be greater than 10:1.

The ion collector 131 can be a metallic wire in a range from about 50 micrometers to about 1 millimeter. The ion collector 131 includes a first end fixed to the ion collector lead 132, and a second end extending toward and space from the anode 121. The length of the ion collector 131 is arbitrary. In one embodiment, the length of the ion collector 131 ranges from about 1 millimeters to about 7 millimeters. The second end of the ion collector 131 can aim to the center point of the anode 121. In one embodiment, the electron emitter 112 is a single carbon nanotube wire. The ion collector 131 and the electron emitter 112 are coaxial.

The ionization vacuum gauge has following advantages. First, the cathode electrode of the present ionization vacuum gauge includes the carbon nanotubes as the emission source, and the gate electrode can be omitted, thus the symmetry of the electric field can be kept, and the sensitivity can be improved. Second, the electrical power supply to the present ionization vacuum gauge is able to be lower, and electrons are emitted from the carbon nanotubes of the cathode electrode without dissipating heat and light and without promoting evaporation. Thus, the present ionization vacuum gauge is suitable for use in a middle vacuum system. Third, the ionization vacuum gauge utilize the electromagnetic shield effect of the shell of testing vacuum system, the shell of the ionization vacuum gauge can be omitted, thus the structure is more simple and low in cost.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An ionization gauge, comprising:

an anode component, wherein the anode component comprises a metallic disk with a through hole, and a thickness of the metallic disk ranges from about 50 micrometers to about 1 millimeter;

an ion collector component located at one side of the anode component and spaced from the anode component; and a cathode component located at another side of the anode component and comprising an electron emitter, wherein the electron emitter comprises a carbon nanotube wire extending toward the anode component, and aiming at a center point of the through hole.

2. The ionization gauge of claim 1, wherein the electron emitter comprises an electron emitting terminal adjacent to the anode component, and a distance from the electron emitting terminal to the anode component ranges from about 1 millimeter to 9 millimeters.

3. The ionization gauge of claim 2, wherein the electron emitting terminal comprises a plurality of electron emitting peaks.

4. The ionization gauge of claim 3, wherein each of the plurality of electron emitting peaks comprises a plurality of carbon nanotubes parallel to each other.

5. The ionization gauge of claim 4, wherein a summit of each of the plurality of electron peaks is defined by a single carbon nanotube protruding from the plurality of carbon nanotubes of each of the plurality of electron emitting peaks.

6. The ionization gauge of claim 5, wherein a diameter of the plurality of carbon nanotubes is smaller than 5 nanometers.

7. The ionization gauge of claim 5, wherein a distance between adjacent two of the summits of the plurality of electron peaks ranges from about 0.1 micrometers to about 2 micrometers.

8. The ionization gauge of claim 7, wherein a ratio between the distance of adjacent two of the summits and a diameter of the single carbon nanotube ranges from about 20:1 to about 500:1.

9. The ionization gauge of claim 1, wherein the carbon nanotube wire is a twisted carbon nanotube wire or an untwisted carbon nanotube wire.

10. The ionization gauge of claim 1, wherein the ion collector is a metallic ring, a metal-enclosed aperture, a metallic net, or a metallic sheet.

11. The ionization gauge of claim 1, wherein a center point of the cathode component, a center point of the anode component, and a center point of the ion collector component are on a common straight line.

12. The ionization gauge of claim 1, wherein the cathode component and the ion collector component are spaced from the anode component at an equal distance.

13. The ionization gauge of claim 1, wherein a diameter of the metallic disk ranges from about 4.1 millimeters to about 12 millimeters.

14. The ionization gauge of claim 1, wherein a first distance $d_1$ between the anode component and the cathode component is equal to a second distance $d_2$ between the anode component and the ion collector component, and the first distance $d_1$ and the second distance $d_2$ are equal to a radius of the through hole.

15. An ionization gauge, comprising:

an anode component, wherein the anode component is a metallic disk with a through hole and a thickness of the metallic disk ranges from about 50 micrometers to about 1 millimeter;

a metallic wire configured to collect ions, the metallic being located at one side of the anode component and spaced from the anode component; and an electron emitter located at another side of the anode component and extending toward the anode component, wherein the electron emitter comprises a carbon nanotube wire.

16. The ionization gauge of claim 15, wherein a diameter of the metallic wire ranges from about 50 micrometers to about 1 millimeter.

17. The ionization gauge of claim 15, wherein the electron emitter comprises a singe carbon nanotube wire extending toward the anode component.

18. The ionization gauge of claim 17, wherein the metallic wire and the carbon nanotube wire are coaxial.

19. An ionization gauge, comprising:

an anode component, wherein the anode component is a metallic disk with a through hole and a thickness of the metallic disk ranges from about 50 micrometers to about 1 millimeter;

an ion collector component located at one side of the anode component and spaced from the anode component; and a cathode component located at another side of the anode component and comprising an electron emitter, wherein the electron emitter comprises a carbon nanotube wire extending toward the anode component and aiming at a center point of the through hole, a first center point of the cathode component, a second center point of the through hole, and a third center point of the ion collector component is on a common straight line to form a symmetrical structure.

* * * * *